Figures 1, 2:
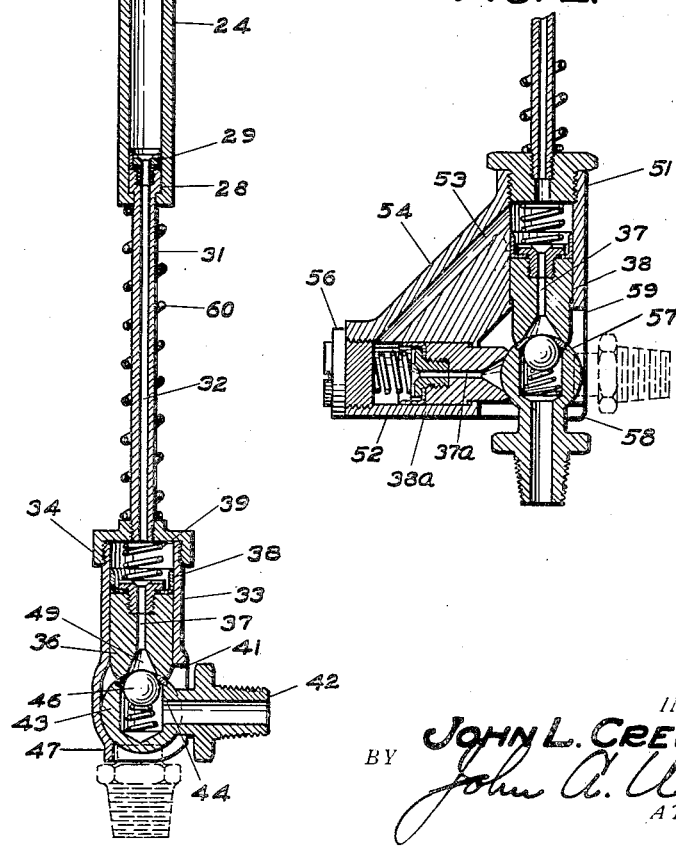

May 8, 1934.　　　J. L. CREVELING　　　1,958,183
LUBRICATING DEVICE
Filed Sept. 17, 1931

INVENTOR
JOHN L. CREVELING
BY
John A. Watson
ATTORNEY

Patented May 8, 1934

1,958,183

UNITED STATES PATENT OFFICE 1,958,183

LUBRICATING DEVICE

John L. Creveling, Tucson, Ariz., assignor to The Lubrication Corporation, South Bend, Ind., a corporation of Delaware Application September 17, 1931, Serial No. 563,406

8 Claims. (Cl. 285—143)

This invention relates to lubricating devices and particularly to high pressure lubricator couplers, such as ordinarily used for the lubrication of automotive vehicles and industrial machinery.

An object of the invention is to provide a lubricating device that is compact and adapted to be used for supplying lubricant to a plurality of similar fittings.

Another object of the invention is to provide a lubricating coupler in which a fitting is gripped and in which the clamping pressure applied to the fitting is a function of the pressure applied to the lubricant.

Another object of the invention is to provide a coupling for a lubricating gun which may be used throughout a wide range of angular relation between the coupling and fitting.

Another object of the invention is to provide a coupling which may be easily disassembled for cleaning or other purposes.

Another object of the invention is to provide a coupling which may be used with fittings of different angularity without changing the position of the gun.

A feature of the invention relates to the construction of the coupling which may have a cylinder and a piston arranged therein in a manner to be acted upon by the lubricant. The cylinder preferably forms a continuation of the gun and is readily detachable therefrom to expose and permit the removal of the piston.

Another feature of the invention relates to the use of two movable pistons arranged at different angular positions in the same coupling and both of which move concurrently to grip a fitting. Each piston is preferably provided with a lubricant conduit throughout, either of which is operative or inoperative to pass lubricant to a fitting depending on the location of the lubricant orifice in the fitting.

Other features and objects of the invention will be apparent from the following description of the invention in connection with which I have illustrated several embodiments in the accompanying drawing in which:

Figure 1 is a sectional view of a lubricating gun constructed according to my invention; and Figure 2 is a modified form of a coupling which may be used with the gun illustrated in Figure 1.

Referring to the drawing, 10 is a lubricant container preferably cylindrical in form having a removable cover 11 within which is rotatably mounted a threaded stem 12 secured to the operating handle 13 by pin 14 and having a thrust collar 16 secured thereto by pin 17 for restraining axial movement of the threaded member 12. A piston 18 has its hub 19 in threaded engagement with stem 12 whereby it may be reciprocated within the container 10 by rotation of the handle 13. A compression washer 21 is preferably provided on piston 18 whereby movement of the piston applies pressure to the lubricant contained in the cylinder 10 and directs it toward the outlet opening 22 provided in the cap member 23. High pressure cylinder 24 is secured to the cap member 23 by any desired means, such as threads 26 and has its upper end closed by a spring pressed check valve 27. A high pressure piston 28 having a compression washer 29 is slidably mounted within the cylinder 24, the lower end of the piston being provided with a substantially inflexible conduit 31 through which lubricant may flow by means of passageway 32 to the coupling 33 which is preferably removably connected to the piston stem 31.

A compression spring 60 may, if desired, be disposed between the lower end of cylinder 24 and the coupling flange member 34. The body of coupling 33 is preferably cylindrical in form and encloses a clamping piston 36 having a lubricant conduit 37 and a compression washer 38, the piston being normally urged outwardly by compression spring 39. The outer end of coupling 33 is provided with a lateral opening 41 through which may be inserted a fitting 42 having a spherical head 43 and a lubricant orifice 44 closed by spring pressed check valve 46. The terminal portion of coupling 33 is in-struck at 47 to provide a seat for the spherical head 43 and the outer end is preferably left open to permit the reception of a fitting having an axial orifice as shown in dotted lines in Figure 1.

In the operation of the gun, coupling 33 is snapped into engagement upon the fitting 42 and cylinder 24 filled with lubricant by rotation of the handle 13. A thrust movement is then applied to the gun in the direction of the coupling which telescopes piston 29 within the cylinder 24 and forces lubricant under high pressure through conduits 32 and 37 to the fitting. The area of piston 38 is preferably larger than the area of the contact orifice 49 whereby pressure of the lubricant on piston 38 acting to force the piston toward the fitting is greater than the force of the lubricant within the orifice tending to separate the piston from the fitting, and the gripping action of the coupling is increased in proportion with the increase in pressure applied to the lubricant. It may be noted that if the resistance to the flow of lubricant is slight, rotation of handle 13 may force lubricant directly through the fitting without the application of a thrust force, but if the pressure applied by rotation of the handle 13 is insufficient, the pressure may be materially increased by a thrust movement of the gun, and such thrust movement will be applied in a direct line to the coupling because of the concentric arrangement or axial alignment of the cylinders 10 and 13 and their intermediate connections.

In the form shown in Figure 2, I have provided a coupling having a pair of cylinders 51 and 52 arranged at an angle of substantially ninety degrees and having the lubricant space above their respective pistons connected by a conduit 53 formed in web 54. The outer end of cylinder 52 is provided with a removable cap 56 whereby the piston may be removed for cleaning purposes in the same manner as the piston contained in cylinder 51. The gripping action of each piston is similar to the form shown in Figure 1 and both pistons are adapted to move concurrently and clamp spherical headed fitting 57 against the shoulder 58. In this form of the invention, fitting 57 is inserted in the coupling through opening 59, and if it be clamped into position shown in full lines, conduit 37 supplies lubricant to the fitting, but if it should be turned to the position shown in broken lines, conduit 37a becomes the one through which the lubricant is supplied. Both pistons 38 and 38a are preferably of equal area whereby the pressures exerted are equal and dependent on the lubricant pressure which is applied to both pistons by the pressure of the lubricant within the high pressure cylinder 24. If desired, the areas of the respective pistons may be changed, or a different angular arrangement made, but I have found that the proportions and angular arrangement illustrated are satisfactory for ordinary purposes.

While I have illustrated and described certain embodiments of my invention, it is understood that this showing and description are illustrative only, and that I do not regard the invention as limited by the forms shown and described, or otherwise except by the terms of the following claims.

I claim:

1. A lubricating device comprising a lubricant conduit, a coupling secured thereto adapted to clamp a lubricant receiving fitting having a head circular in cross sectional contour, said coupling including a plurality of members mounted for right line movement, and means for moving said members toward the center of said fitting head to clamp the coupler upon the fitting.

2. A lubricating device comprising a lubricant conduit, a coupling secured thereto adapted to clamp a lubricant receiving fitting having a head circular in cross sectional contour, said coupling including a plurality of lubricant pressure operated pistons arranged to move toward the center of said fitting head to clamp the coupler upon the fitting.

3. A lubricating device comprising a lubricant conduit, a coupling secured thereto adapted to clamp a lubricant receiving fitting having a head circular in cross sectional contour, said coupling including a pair of angularly disposed lubricant pressure operated pistons arranged to move toward the center of said fitting head to clamp the coupler upon the fitting, one of said pistons being axially aligned with said conduit.

4. In a lubricating device, a coupling for servicing a spherical head lubricant receiving fitting, comprising cylinders having pistons arranged at substantially right angles to one another, and means for supplying fluid pressure to said cylinders concurrently to move the pistons toward a common center, the adjacent ends of said pistons being fashioned to engage with the spherical head of the fitting and to locate the center of said spherical head on said common center when the coupler is clamped upon the fitting.

5. In a lubricating device, a conduit adapted to transmit thrust, a coupling for servicing a spherical head lubricant receiving fitting fixed to said conduit, comprising cylinders having pistons arranged at an angle to one another, and means for supplying fluid pressure to said cylinders concurrently to move the pistons toward a common center, the adjacent ends of said pistons being fashioned to engage with the spherical head of the fitting and to locate the center of said spherical head on said common center when the coupler is clamped upon the fitting.

6. A coupling for a lubricating device comprising a lubricant conduit and a pair of angularly disposed pistons arranged to move convergently to clamp a fitting against a wall of the coupling, said pistons each providing lubricant passageways from said conduit to that area of the coupling within which said fitting is received.

7. A coupling for a lubricating device comprising a lubricant conduit, a pair of angularly disposed pistons arranged to move convergently to clamp a fitting against a wall of the coupling, said pistons each providing lubricant passageways from said conduit to that area of the coupling within which said fitting is received, and lubricant pressure operated means for urging said pistons convergently each into engagement with said fitting.

8. A lubricating device comprising a lubricant conduit adapted to transmit thrust, a coupling secured thereto having a pair of angularly disposed pistons one of which is aligned with the conduit, each of said pistons having a lubricant conducting passageway therethrough communicating with the conduit and means for applying lubricant pressure from the conduit to both pistons to move them concurrently toward a common center.

JOHN L. CREVELING.